(No Model.)

T. ROUSE.
PNEUMATIC TIRED WHEEL.

No. 548,094. Patented Oct. 15, 1895.

WITNESSES.
William H. James.
Alfred H. Broad.

INVENTOR.
Thomas Rouse.
per Robert E. Phillips
Attorney.

UNITED STATES PATENT OFFICE.

THOMAS ROUSE, OF UPMINSTER, ENGLAND.

PNEUMATIC-TIRED WHEEL.

SPECIFICATION forming part of Letters Patent No. 548,094, dated October 15, 1895.

Application filed August 5, 1895. Serial No. 558,288. (No model.) Patented in England May 14, 1895, No. 9,514.

*To all whom it may concern:*

Be it known that I, THOMAS ROUSE, a subject of the Queen of Great Britain, residing at Upminster, in the county of Essex, England, have invented a new and useful Improvement in Pneumatic-Tired Wheels for Carriages and other Road-Vehicles, (for which I have obtained a patent in Great Britain, No. 9,514, dated the 14th of May, 1895,) of which the following is a specification.

This invention relates to an improved pneumatic tire for carriages and other road-vehicles, and it has for its object the easy and ready adaptation of a pneumatic tire to the ordinary wheels of carriages and other road-vehicles without the use of a new or supplemental metallic rim or felly.

Figure 1:
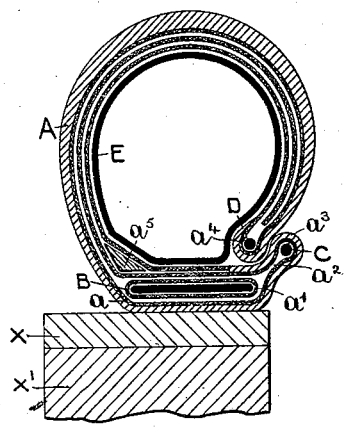
Figure 2:
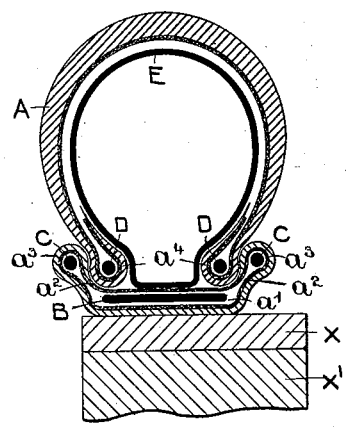
Figure 3:
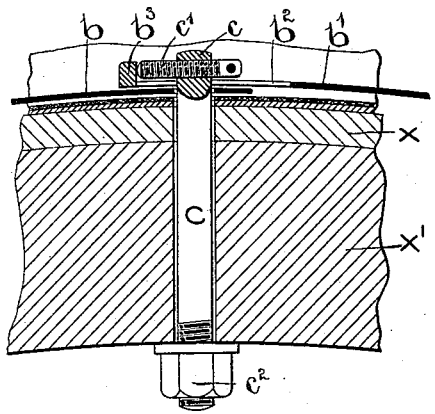
Figure 5:
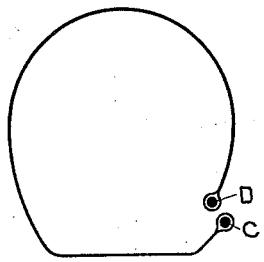
Figure 4:
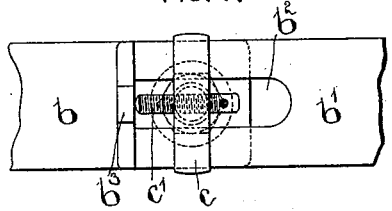
Figure 6:
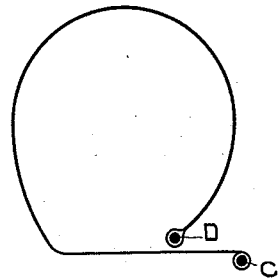

In the accompanying drawings, which illustrate this invention, Figure 1 is a view in transverse section of one form my improved tire may assume. Fig. 2 is a similar view of another form it may assume. Figs. 3 and 4 are broken views in elevation and plan, respectively, of a suitable tightening device for the fixing-band; and Figs. 5 and 6 are diagrammatic views showing alternative methods of opening the tire-cover to expose the air-tube.

Similar letters refer to similar parts throughout the several views.

The cover A of the tire is made of rubber reinforced with canvas or other fabric in the well-known manner, and its shape in cross-section approximates to that of an arch with a flat base. In the base $a$ of the cover is formed a pocket $a'$, in which is located a band B, adapted to be drawn up to fix the cover A onto the ordinary metal rim X of a wheel.

The band B is provided with any suitable device, such as the one illustrated by Figs. 3 and 4, for drawing it up, and it may also be provided with one or more extra radial studs or bolts adapted to pass through the rim X and felly X for preventing any possible side movement of the cover A on the wheel-rim. The fixing device illustrated consists of a bolt C, having a flat head $c$, into which is threaded a small set-screw $c'$. The bolt C passes through a hole in one end $b$ of the band B and is provided with a nut $c^2$, whereby it can be locked to the wheel-rim. In the other end $b'$ of the band B is a slot $b^2$, through which the bolt B passes, and on it is a projection $b^3$, against which the set-screw $c'$ impinges and thus draws the band up taut.

The cover A is preferably mounted out of center with the rim X, as shown in the drawings, so that the outside edge of the said rim stands proud of the side of the pneumatic tire when inflated and thus protects it from being rubbed up against curbstones and the like.

The cover A is divided at one side, and on one edge of the base $a$ of the cover A is formed a flexible lip $a^2$, in the edge $a^3$ of which is formed a pocket adapted to receive a hoop or band C, preferably made of steel wire. In the other edge $a^4$ of the cover A is formed a pocket adapted to receive a hoop or band D, preferably made of steel wire. One or other of the bands C and D is made adjustable in its length by any approved means, such as a right-and-left-handed screw-coupling or equivalent device, to permit of the two edges of the cover being interlocked. If the band C is made inextensible in the form of a hoop, the band D is made adjustable, and its length is contracted when fixing the cover until it is firmly seated on the top of the base $a$ of the cover, as shown by Fig. 1. To expose the air-tube E, which is of the well-known construction, the band D is expanded until the edge $a^4$ of the cover is of such a size that it will pass over the edge $a^3$, containing the hoop C, as shown by Fig. 5. On the other hand, if the band D is made inextensible in the form of a hoop, the band C is made adjustable, so that its length can be contracted to reduce the circumference of the edge $a^3$ to allow the edge $a^4$, containing the hoop D, to pass over it, as shown by Fig. 6.

To stiffen the cover and prevent any tendency to roll or wear on the edge of the fixing-band, the corner of the cover A, when made in one with the base $a$, is preferably filled up with an angle ring or piece $a^5$, of rubber or other suitable meterial.

As an alternative construction the cover A may be made separate from the base $a$, in which case a lip, with a band C, is formed on each edge and both edges of the cover are made alike, as shown by Fig. 2. In this construction both of the bands C and D on one side of the tire may be made as hoops, as it is only necessary to open one side of the cover to expose the air-tube. I prefer to locate the sides of the tire-cover adapted to be opened on the inner side of the wheel-rim; but this is not obligatory.

My improved pneumatic tire can be fixed to any existing road-vehicle wheel by merely drilling two or more holes through the rim and felly for the passage of the stem of the inflation-valve and for the bolt or bolts of the fixing-band. It can also be readily detached, thus allowing the wheel to be run on the ordinary iron rim in case the tire becomes so damaged that it cannot be repaired on the spot.

I am aware that pneumatic tires have already been made with divided covers, the edges of which contain inextensible bands or cords adapted to interlock and thus close the cover, and also that the covers of pneumatic tires have been fixed to wheel-rims by adjustable bands, and I do not therefore claim such, broadly; but What I do claim, and desire to secure by Letters Patent, is—

1. The combination, with a wheel rim, and a pneumatic tire cover encircling the same, of a band B arranged in the said cover and provided with a hole in one end of it, and a slot in its other end and a projection on its said other end, a bolt secured to the said rim, passing through the said hole and slot, and provided with a T-shaped head bearing on the overlapping ends of the said band, and a tightening screw engaging with the said head and bearing against the said projection, substantially as set forth.

2. The combination, with a wheel rim, of a pneumatic tire cover provided with pockets at its edges, a band B arranged inside the said cover and operating to secure it to the wheel rim, an air tube in the cover above the said band, wires arranged in the said pockets and operating to secure the said cover over the air tube, the said pockets being arranged to one side of the air tube and above the band B, and a filling ring, triangular in cross-section, interposed between the said air tube and the edge of the band B on the opposite side of the tire from the said pockets, substantially as set forth.

THOMAS ROUSE.

Witnesses:
ROBERT E. PHILLIPS,
W. H. JAMES.